United States Patent [19]

Bojarski et al.

[11] Patent Number: 5,320,376
[45] Date of Patent: Jun. 14, 1994

[54] TRAILER

[75] Inventors: John C. Bojarski, Green Bay; Thomas M. Gerondale, Wrightstown, both of Wis.

[73] Assignee: Sure Steer Axle Co., Inc., Brillion, Wis.

[21] Appl. No.: 917,822

[22] Filed: Jul. 21, 1992

[51] Int. Cl.$^5$ .................. B62D 13/02; B62D 13/06
[52] U.S. Cl. .................. 280/442; 280/460.1; 280/DIG. 14
[58] Field of Search .................. 280/442, 443, 405.1, 280/426, 460.1, DIG. 14, 446, 491.1, 491.2

[56] References Cited

U.S. PATENT DOCUMENTS

| 1,712,063 | 5/1929 | Agramonte | 280/442 |
|---|---|---|---|
| 2,083,049 | 6/1937 | Byron | 280/442 |
| 2,498,779 | 2/1950 | Winchester | 280/405.1 |
| 2,644,697 | 7/1953 | Peterson | 280/442 |
| 2,674,463 | 4/1954 | Peterson | 280/442 |
| 2,674,464 | 4/1954 | Peterson | 280/442 |
| 3,149,858 | 9/1964 | Gilbert | 280/442 |
| 3,337,234 | 8/1967 | Ishizuka | 280/99 |
| 3,734,538 | 5/1973 | Humes | 280/426 |
| 4,405,147 | 9/1983 | Horsman et al. | 280/443 |
| 4,463,966 | 8/1984 | Stoddard | 280/442 |
| 4,824,135 | 4/1989 | McGregor | 280/442 |
| 4,988,115 | 1/1991 | Steinke | 280/404 |
| 5,011,177 | 4/1991 | Grice | 280/491.2 |

FOREIGN PATENT DOCUMENTS 2245235  1/1992  United Kingdom ............... 280/442

Primary Examiner—Mitchell J. Hill
Attorney, Agent, or Firm—Andrus, Sceales, Starke & Sawall

[57] ABSTRACT

A trailer is provided having a support frame and a steering axle. The steering axle is rotatable between a first position providing a positive caster and a second position providing a negative caster. The axle is rotated by means of a tongue adjustable between a forward and a rearward position. A connector rod is pivotally connected to the tongue and secured to the axle such that the connector rod rotates the axle into the first position providing a positive caster when the tongue is located in the forward position and rotates the axle to a second position providing a negative caster when the tongue is in the rearward position.

10 Claims, 3 Drawing Sheets

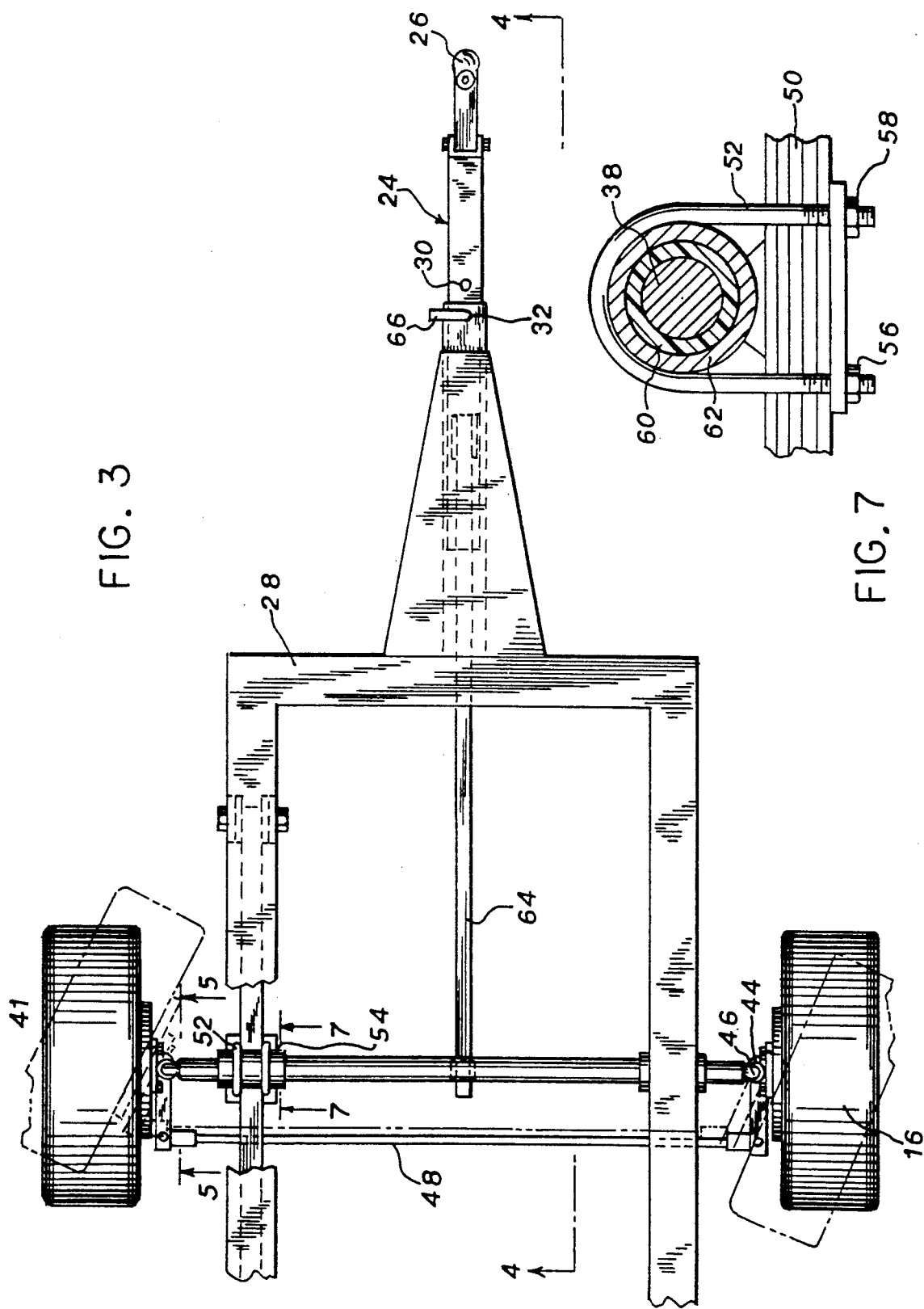

TRAILER

BACKGROUND OF THE INVENTION

This invention relates generally to trailers, and more particularly to a trailer wherein the steering wheels of the trailer follow the steering wheels of a tow vehicle when the tow vehicle moves in both a forward and a reverse direction.

Typically, the steering wheels of a standard trailer will follow the steering wheels of a tow vehicle when the tow vehicle is moving in the forward direction. However, when the tow vehicle backs up the steering wheels of the trailer turn the wrong way, thereby jack-knifing the trailer and the tow vehicle. This invention is directed toward a trailer wherein the trailer steering wheels follow the steering wheels of the tow vehicle when the tow vehicle moves in both a forward and a reverse direction.

Previous attempts at trailer steering devices can be seen in Winchester U.S. Pat. No. 2,498,779, which pertains to a self guiding trailer dolly having a connection for easy backing; Horseman et al U.S. Pat. No. 4,405,147, directed to a low tongue weight, wagon type, trailer with antijack-knife steering for backing the trailer; and Stoddard U.S. Pat. No. 4,463,966 describing an antijack-knife, hay wagon type trailer.

SUMMARY OF THE INVENTION

The invention is a method and device for allowing the steering wheels of a trailer to follow the steering wheels of a tow vehicle when the tow vehicle moves in both a forward and a reverse direction. The invention allows the user to rotate the steering axle of the trailer from a positive caster to a negative caster and vice versa. When the steering axle of the trailer is in a positive caster, the steering wheels of the trailer will follow the steering wheels of the tow vehicle when the tow vehicle is moving forward. Likewise, when the steering axle of the trailer is in a negative caster, the steering wheels of the trailer will follow the steering wheels of the tow vehicle, when the tow vehicle moves in a reverse direction. In both cases, the steering wheels of the trailer turn direction in unison with the turning of the tow vehicle steering wheels.

The device is comprised of a tongue which interconnects the trailer and the tow vehicle. The tongue is movable between two positions, a forward and a rearward position. A connector rod is secured to the steering axle and pivotally mounted to the tongue. When the tongue is in the forward position, the connecting rod forces the trailer's steering axle to rotate to a positive caster. When the tongue is located in the negative position, the connecting rod forces the trailer steering axle to rotate to a negative caster. In the preferred embodiment, the tongue is maintained in either the forward or rearward position by means of a pin which extends through the frame of the trailer and the tongue.

It is therefore a primary objective of this invention to develop a trailer having a means for moving a steering axle between a first position providing a positive caster and second position providing a negative caster.

It is a further objective to provide a method for having the steering wheels of a trailer follow the steering wheels of a tow vehicle to which the trailer is attached.

A still further objective is to provide a trailer wherein the trailer steering wheels follow the steering of a tow vehicle moves in both a forward and reverse direction.

These and other objectives will become evident throughout this disclosure.

BRIEF DESCRIPTION OF THE DRAWINGS

FIG. 3 is an upper plan view of the invention;
FIG. 7 is a sectional view of the trailer steering axle and its suspension.

DETAILED DESCRIPTION OF THE DRAWINGS

Figure 1:
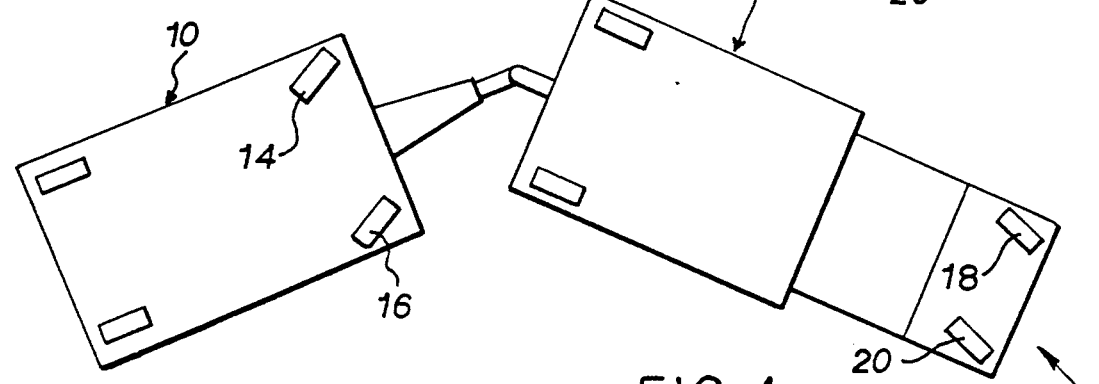
FIG. 1 is a top view of the prior art trailer in operation.

The trailer is generally designated by the reference numeral 10. A tow vehicle is generally designated by the reference numeral 12. In the prior art, reversing a trailer 10 could be a nightmarish experience. As shown in FIG. 1, when tow vehicle 12 attempts to back up, the wheels 14, 16 of the trailer 10 turn in a direction opposite to the wheels 18, 20 of the tow vehicle 12, thereby causing trailer 10, and tow vehicle 12 to jack-knife.

The trailer 10 of the present invention may be comprised of a support frame 28 and a tongue 24 having a hitch 26 for attachment of the trailer 10 to a tow vehicle 12. Two apertures 30, 32 extend through tongue 24. Likewise, an aperture 34 extends through support frame 28. The tongue 24 is axially slidable within the frame between a first forward position where apertures 34 and 32 line up and a rearward position where apertures 34 and 30 line up. A stop 36 is provided to prevent tongue from sliding beyond either of the desired positions.

A steering axle 38 is provided to interconnect wheels 14 and 16. Each wheel 14, 16 is connected to the steering axle 38 by means of a bracket 40 which is mounted to each wheel 14, 16 by bolts 42. A socket 44, as best seen in FIG. 3, is provided by bracket 40 for receipt of a king pin 46 located at each end of steering axle 38. A tie rod 48 also interconnects each bracket 40 of wheels 14 and 16. The tie rod 48 insures that the wheels 14, 16 turn in unison.

Steering axle 38 is suspended to support frame 28 by means of the leaf spring system 50. The steering axle 38 is connected to spring 50 by two pairs of U-bolts 52 and 54. The U-bolts 52, 54 extend about the steering axle 38 and through spring 50 and are maintained in position by nuts 56 and 58. A casing 60 with a bearing sleeve 62 within is placed about the axle 38, between the 10 axle and U-bolts 52 and 54. The casing 60 and sleeve 64 arrangement allows axle 38 to rotate while mounted on spring 50.

In the preferred embodiment, tongue 24 and steering axle 38 are interconnected by an L-shaped connecting rod 64. Rod 64 is connected to axle 38 and pivotally mounted to tongue 24.

Figure 6:
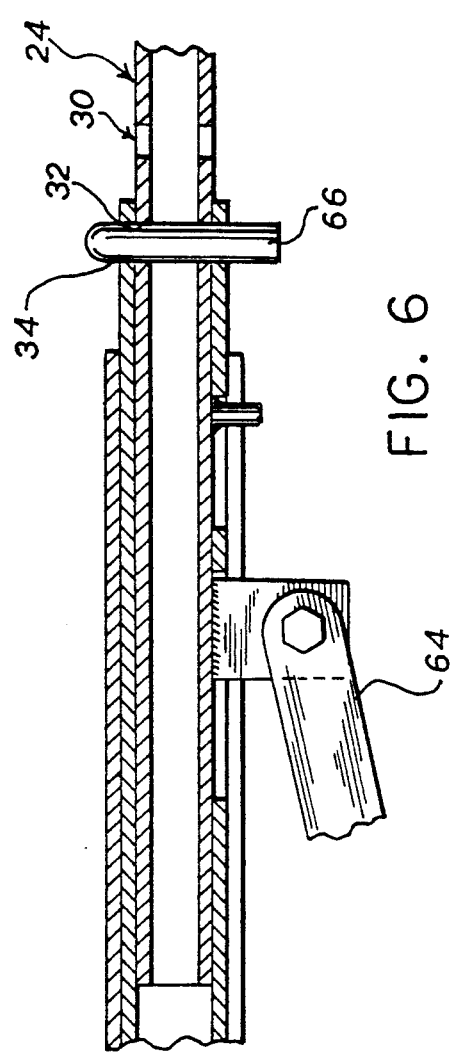
FIG. 6 is a side view of the tongue.
Figure 5:
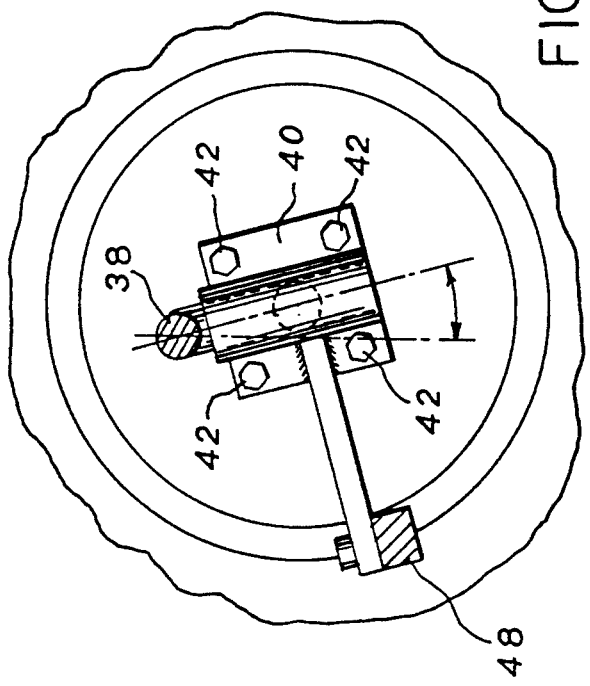
FIG. 5 is a sectional view showing the trailer steering axle in a positive caster.

In use, trailer 10 is connected to tow vehicle 12 by hitch 26. If the tow vehicle 12 is going to be used to pull trailer 10 forward, the user slides tongue 24 axially so as to align apertures 34 and 32, as seen in FIG. 6. A pin 66 is placed within apertures 34 and 32 to maintain the tongue 24 in its position relative to support frame 28. When tongue 24 is in the forward position and apertures 34 and 32 are in alignment, connecting rod 64 rotates steering axle 38 in a counterclockwise direction as shown in FIG. 5, thereby changing the caster to a positive position. As a result, the wheels 14, 16 of the trailer lo will follow the steering wheels 18, 20 of the tow vehicle 12. Tie rod 48 insures that the wheels 14 and 16 of the trailer 10 turn direction in unison.

Figure 2:
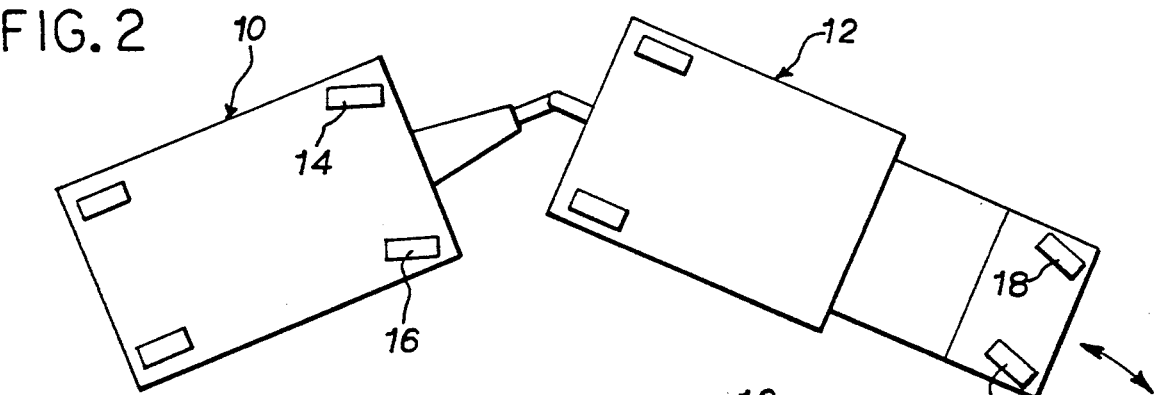
FIG. 2 is a top view of the invention.
Figure 8:
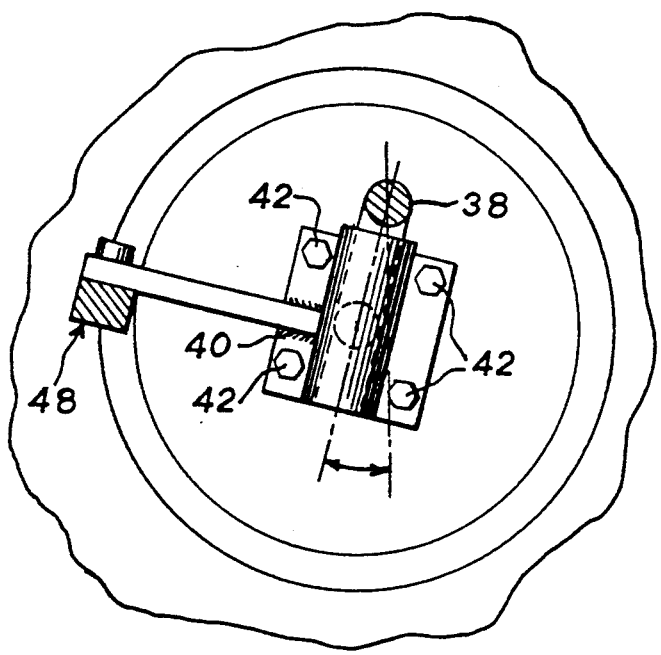
FIG. 8 is a sectional view showing the steering axle in a negative caster.
Figure 4:
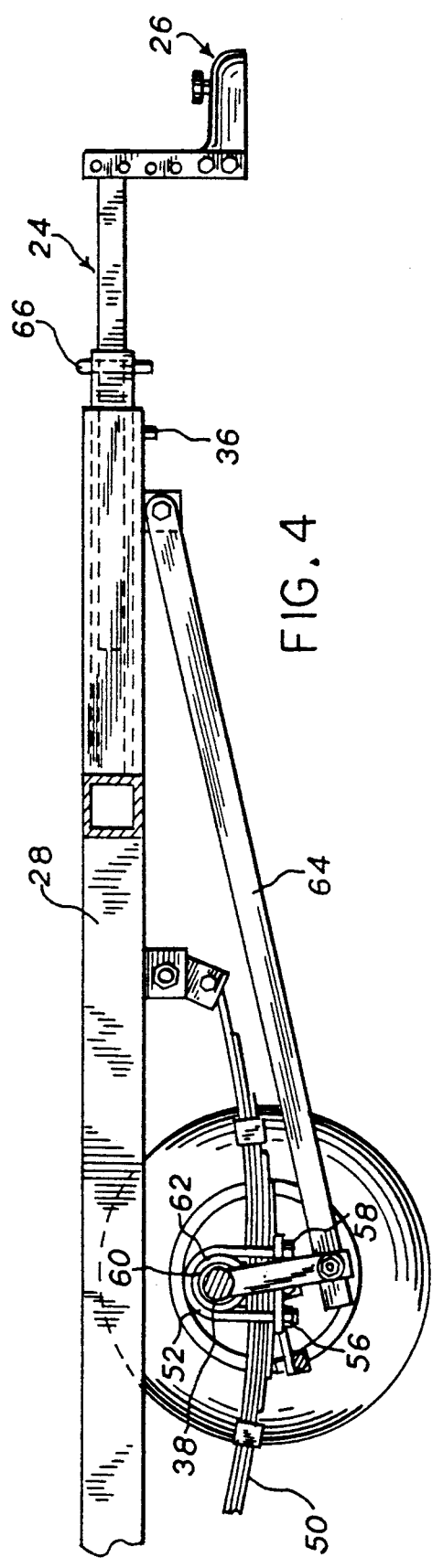
FIG. 4 is a side view of the invention.

When the tow vehicle 12 is used to back up the trailer 10, tongue 24 is axially moved so as to align apertures 34 and 30. Pin 66 is then placed within the apertures to maintain the tongue and support frame in position. The movement of the tongue causes connecting rod 64 to rotate in a clockwise direction, thereby changing the caster to a negative, as depicted in FIG. 8. Being a negative caster, the steering wheels 14, 16 of the trailer 10 will follow the steering wheels 18, 20 of the tow vehicle 12, when the tow vehicle 12 moves in a reverse direction. This can be seen in FIG. 2. As previously discussed, tie rod 48 ensures steering wheels 14, 16 of trailer 10 turn direction in unison.

Of course, other mechanisms and controls can be used for shifting the caster of the axle without departing from the scope and spirit of the invention.

It can be seen from the above description, that the invention accomplishes at least all of its stated objectives. It is recognized that various alternatives and equivalents are possible without deviating from the spirit of this invention as set forth in the following claims.

We claim:

1. A trailer having a support frame comprising:
   a steering axle maintained on the support frame;
   a tongue adjustable between a forward position and a rearward position; and
   a connector rod pivotally connected to the tongue and secured to the axle such that the connector rod rotates the axle into a first position providing a positive caster when the tongue is located in the forward position and rotates the axle to a second position providing a negative caster when the tongue is in the rearward position.

2. The trailer of claim 1 further comprising a pin extending through the support frame and the tongue for maintaining the tongue in either the forward or the reverse position.

3. A trailer for a towing vehicle having a steering axle comprising:
   a support frame;
   a trailer steering axle rotatably mounted to the support frame;
   a tongue for interconnecting the trailer and the tow vehicle;
   means for varying the tongue between a forward position and a rearward position;
   means for locking the tongue in either its forward or rearward position;
   means for interconnecting the trailer steering axle and the tongue whereby the trailer steering axle is rotated to a first position providing a positive caster when the tongue is located in the forward position and the trailer steering axle is rotated to a second position providing a negative caster when the tongue is located in the rearward position.

4. The trailer of claim 3 further comprising a spring a to the support frame such that the trailer steering axle is suspended by the spring;
   a plurality of U-bolts to maintain the trailer steering axle on the spring;
   means for interconnecting the U-bolts to the spring; and
   a casing, with a bearing sleeve within, placed about the trailer steering axle between the trailer steering axle and the U-bolts.

5. A method for having the steering wheels of a trailer including a steering axle follow the steering wheels of a tow vehicle to which the trailer is attached, comprising:
   providing a tongue for interconnecting the trailer and the tow vehicle, the tongue being movable between a forward position and a rearward position;
   interconnecting the trailer steering axle and the tongue with a connector rod such that the connector rod rotates the axle to a first position providing a positive caster when the tongue is located in the forward position and rotates the axle to a second position providing a negative caster when the tongue is in the rearward position;
   placing the tongue in the forward position before the tow vehicle moves in a forward direction;
   placing the tongue in the second reverse position before the tow vehicle moves in a reverse direction; and
   locking the tongue in position.

6. A trailer having a support frame and a steering axle connected thereon, comprising:
   means for moving the steering axle between a first position providing a positive caster and a second position providing a negative caster;
   a tongue for interconnecting a trailer and a tow vehicle;
   means for moving the tongue between a forward position and a rearward position;
   means for locking the tongue in either its forward or rearward position; and
   a connector rod pivotally connected to the tongue and secured to the axle such that the connector rod rotates the axle into its first position when the tongue is in the forward position and rotates the axle to its second position when the tongue is in the rearward position.

7. The device of claim 6 wherein the means for locking the tongue is comprised of a pin extending through the support frame and the tongue for maintaining the tongue in either the forward or the rearward position.

8. A trailer for a tow vehicle having a steering axle comprising;
   a support frame;
   a spring affixed to the support frame such that the steering axle is suspended by the spring;
   a plurality of U-bolts to maintain the trailer's steering axle on the spring;
   means for interconnecting the U-bolts to the spring;
   a casing, with a bearing sleeve within, placed about the steering axle between the steering axle and the U-bolts; and
   means for moving the steering axle between a first position providing a positive caster and a second position providing a negative caster.

9. The trailer of claim 8 wherein the trailer further comprises:
   a tongue for interconnecting the trailer and the tow vehicle;
   means for moving the tongue between a forward position and a rearward position; and means for locking the tongue in either the forward position or the rearward position.

10. The trailer of claim 9 wherein the means for moving the steering axle comprises a connector rod pivotally connected to the tongue and secured to the steering axle such that the connector rod rotates the axle into the first position when the tongue is located in the forward position and rotates the axle to the second position when the tongue is in the rearward position.

* * * * *